US007021763B2

(12) United States Patent
Welk et al.

(10) Patent No.: US 7,021,763 B2
(45) Date of Patent: Apr. 4, 2006

(54) METHOD FOR REPRESENTING AND OPTIMIZING A DOUBLE-PROGRESSIVE SPECTACLE LENS

(75) Inventors: Andrea Welk, Munich (DE); Peter Baumbach, Munich (DE); Walter Haimerl, Munich (DE); Herbert Pfeiffer, Munich (DE); Gregor Esser, Munich (DE); Helmut Altheimer, Lauchdorf (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 10/470,968

(22) PCT Filed: Feb. 4, 2002

(86) PCT No.: PCT/DE02/00391

§ 371 (c)(1),
(2), (4) Date: Jan. 26, 2004

(87) PCT Pub. No.: WO02/061496

PCT Pub. Date: Aug. 8, 2002

(65) Prior Publication Data

US 2004/0114104 A1    Jun. 17, 2004

(30) Foreign Application Priority Data

Feb. 2, 2001 (DE) .................................. 101 04 700

(51) Int. Cl.
*G02C 7/02* (2006.01)
(52) U.S. Cl. ....................................... 351/177; 351/169
(58) Field of Classification Search ................ 351/159, 351/168, 169, 172, 177
See application file for complete search history.

(56) References Cited

U.S. PATENT DOCUMENTS

| 4,952,047 A | * | 8/1990 | Barth et al. ................. 351/169 |
| 6,106,118 A |   | 8/2000 | Menezes et al. ............ 351/169 |
| 6,824,268 B1 | * | 11/2004 | Rubinstein et al. ......... 351/177 |

OTHER PUBLICATIONS

International Search Report.

* cited by examiner

*Primary Examiner*—Scott J. Sugarman
*Assistant Examiner*—Darryl J. Collins
(74) *Attorney, Agent, or Firm*—Crowell & Moring LLP

(57) ABSTRACT

A method for representing and optimizing a double-progressive spectacle lens is characterized by the following steps: selecting a suitable coordinate system K2 for the representation of a back surface; selecting a suitable grid G for the representation of a spline of the back surface of a starting lens to be optimized in a coordinate system K2; assigning sagittal height data of the back surface to a spline (back surface spline); defining a position of a center of rotation of an eye; computing principal rays from the center of rotation of the eye through the starting lens at grid points of G; computing a length of a distance between points of penetration of a thus computed principal ray through a front surface and the back surface (oblique thickness); assigning data of the oblique thickness (thickness spline) to a spline; selecting a set of assessment positions at which an optical quality is computed for a target function; suitably selecting particular optical and geometrical stipulations which ideally should be satisfied at the assessment positions; defining the target function as a deviation of the quality of an actual spectacle lens from ideal values; starting the optimization; evaluating at each one of optimization steps the optical properties in a wearing position at the assessment points by means of surface properties to be computed and actual principal ray data; ending the optimization when the target function is below a particular value, or after a specifiable maximum number of optimization steps.

20 Claims, No Drawings

METHOD FOR REPRESENTING AND OPTIMIZING A DOUBLE-PROGRESSIVE SPECTACLE LENS

TECHNICAL FIELD

The invention relates to a method for fabricating a double-progressive spectacle lens, which particularly comprises a representation and optimization of both surfaces of this spectacle lens.

Within the scope of the present application a double-progressive spectacle lens is understood to be a spectacle lens in which a front surface and also an eye-side surface contribute to an increase of power from a distance portion to a near portion.

STATE OF THE ART

Progressive spectacle lenses have been known for a long time. On most of the progressive spectacle lenses known from the patent literature merely one surface is progressive; this means that merely one surface contributes to an increase of the power from the distance portion to the near portion.

For spectacle lenses in which merely one surface contributes to the increase of power from the distance portion to the near portion it is known to compute and fabricate in advance a particular "series" of progressive "base curves", the second (non-progressive) surface being left still unfinished. Designated as a base curve is a surface having a particular value of surface power at the distance reference point (according to ISO), and a (surface) addition power which differs according to specification. (The (surface) addition power according to ISO Standard is the difference between the surface power at the distance reference point and that at the near reference point.)

Spectacle lenses which are finished on one side and as a rule are uncut and round, are also designated as blanks. On these, the progressive surface is frequently the front surface.

The power at the so-called "distance reference point", as stipulated by a prescription, is then achieved by means of a suitably shaped second surface, i.e. by a suitable choice of an eye-side surface in the case of a progressive front surface. The second surface then also provides any astigmatic power which may have been prescribed. Because in every case the second surface provides the power stipulated by the prescription, the second surface is also described as the prescription surface.

For this, it is also known to compute individually the prescription surface for individual conditions of use, such as for example the interpupillary distance, pantoscopic angle, vertex distance, etc., taking into account the so-called (general) prescription (power at the distance reference point, astigmatism and orientation of the axis of astigmatism, and also the addition power). It is pointed out expressly that the above listing of individual conditions of use is not exhaustive. Moreover, attention is drawn to the general literature.

Furthermore, it is known to start out from a spectacle lens that is finished on one side to have a (finished) spherical, aspherical, toroidal or atoroidal surface—which as a rule is the front surface—and to compute the progressive surface taking into account the individual wearing conditions as well as the spectacles prescription. The progressive surface which then "provides" not only the increase of power but also the so-called prescription values, is then as a rule the eye-side surface.

Furthermore, in the patent literature it was already proposed a long time ago that spectacle lenses be provided with two progressive surfaces, i.e. with two surfaces which contribute to an increase of power from the distance reference point to the near reference point.

On the one hand, the use of spectacle lenses having two progressive surfaces has the advantage that the power increase between the distance reference point and the near reference point, i.e. the addition power, is apportioned onto two progressive surfaces. Because the aberrations and, in particular, the maximum value of surface astigmatism present on each one of the surfaces increase more than linearly with the addition power of the surface, a progressive spectacle lens having two progressive surfaces will for this reason already produce smaller image defects than a progressive spectacle lens having only one progressive surface and the same "total addition power".

In addition, it is possible to "position" the maxima of troublesome surface astigmatism as well as of other troublesome image defects of the front surface and of the eye-side surface at different places, so that a vector addition leads to smaller overall values. Furthermore, the image defects of the front surface and the eye-side surface may cancel out at least partly.

The above expositions show that a progressive spectacle lens having two progressive surfaces has advantages when compared with a progressive spectacle lens having only one progressive surface, even when the second surface of a progressive spectacle lens having only one progressive surface has been specially computed to take into account the prescription values and, if necessary, to compensate any image defects of the progressive surface.

On the other hand, many aberrations and therewith much discomfort of progressive spectacle lenses can be avoided by means of an individual computation of a progressive surface.

For progressive lenses having only one progressive surface, it is actually prior art to add with optimization a progressive surface to a given surface, such as that of a sphere or a torus, in such manner that, for example, a specifiable target function defining the optical and geometric quality is minimized.

An individual computation of at least one progressive surface of a progressive spectacle lens having two progressive surfaces which contribute to a power increase has hitherto not been known.

However, such an individual computation would be of particular interest when individual spectacle lenses having two progressive surfaces and properties which are superior to those of individually computed spectacle lenses having one progressive surface are to be fabricated.

In this case there is also an interest in computing spectacle lenses having two progressive surfaces rapidly and, above all, in an automatic optimizing operation.

DESCRIPTION OF THE INVENTION

The invention is based on the object of providing a method for fabricating a double progressive spectacle lens, which comprises particularly a representation and optimization of both surfaces of this spectacle lens and permits an individual computation and fabrication of a spectacle lens having two progressive surfaces. In particular, the invention is to permit an automatic computation of individual spectacle lenses having two progressive surfaces.

An achievement of this object in accordance with the invention is set out in patent claim 1. Further developments of the invention are the subject matter of the dependent claims.

For a computation of double progressive spectacle lenses it would appear to be obvious also to proceed in the same way as with conventional individually optimized progressive spectacle lenses. In this case, to a given progressive surface contributing only a certain part of the addition power of the spectacle lens, would be added with optimization a second surface which would then provide the remainder of the prescribed power increase and also, as may be needed, individual corrections—such as for astigmatism, orientation of the astigmatism axis, power defects etc. In extreme cases the given surface might even contribute too much to the addition power, and the other surface—added with optimization—would then be a degressive surface, i.e. a surface making a contribution which would reduce the overall addition power of the spectacle lens.

It is characteristic of this manner of proceeding that one of the two progressive surfaces is kept constant or is predetermined, its coefficients are therefore not varied during the optimization of the other surface. Thus all degrees of freedom are associated with the surface to be varied. This manner of proceeding corresponds to the conventional manner of proceeding in which blanks are fabricated "as stock".

However, in accordance with the invention it has been realized that substantially better optimization results can be obtained only when the front and the back surface are optimized at the same time, i.e. when the coefficients of both surfaces are simultaneously varied. In this case, the degrees of freedom of the front and back surface can be made use of simultaneously.

This is contrary to the manner of proceeding of a person skilled in the art who is working in the relevant field: he would actually not only adhere to the conventional manner of proceeding in which blanks are fabricated, but he would also represent the front as well as the back surface as splines on two grids, i.e. the front surface as a spline on a grid of the front surface, and the back surface as a spline on a grid of the back surface, each with a separate coordinate system.

But then problems would arise during the optimization in a position of use, which reside in the positions of the representation grids of the splines of the front and back surfaces with respect to each other. One of these problems occurs at the edge of each region to he optimized. Inside the edge of the spline grid the surface is determined by the coefficients, but outside it is undetermined.

At the beginning of the optimization—in the so-called starting condition—the grid would, of course, be selected so that each principal ray passing through the center of rotation of the eye and one of the assessment points on the back surface (or the front surface) will penetrate the front surface (or the back surface) within the grid region of the spline. Then the sagittal heights, normals to surfaces, and surface curvatures on each surface will have valid values. However, during the optimization the case may arise in which the sagittal heights and the surface normals of one of the surfaces assume values at which the principal ray would penetrate the other surface outside the grid, i.e. in an invalid region. This would lead to invalid values in the target function and render the optimization unnecessarily difficult.

A further problem occurring mainly at high powers is that with an assessment grid held fixed on the back surface, the divergence of the principal rays between the refracting surfaces during the optimization can become so large that on the front surface whole portions of a partial grid remain without penetration points and are therefore not assessed. The coefficients acting there may then be altered according to the optimization method employed in a manner which significantly impairs local optical properties.

GENERAL DESCRIPTION OF THE INVENTION

In accordance with the invention a method is provided in which (preferably) the front surface is represented on the grid of the back surface. In principle, but not preferred, the reverse manner of proceeding is also possible.

Each point on the front surface is described in terms of a corresponding point on the back surface, which lies on a principal ray through the center of rotation of the eye, and of the so-called oblique thickness along this principal ray. When a point on the back surface having the radius vector $r_2(x_2, y_2)$ is given, then the corresponding point $r_1(x_2, y_2)$ on the front surface can be calculated from $$\vec{r}_1(x_2,y_2) = \vec{r}_2(x_2,y_2) - d(x_2,y_2) \cdot \vec{t}(x_2,y_2) \quad (1)(1)$$

The subscript 1 refers to the front surface, whilst the subscript 2 refers to the back surface.

t is the unit vector of the principal ray between the two surfaces along the direction of the light, and D which is a scalar parameter, is the so-called oblique thickness.

The vector $-d \cdot t$ is directed from the point of penetration of the principal ray through the back surface to the point of penetration through the front surface.

Thus, with this definition the front surface is only then given or defined when a principal ray passing through the back surface exists or can be computed successfully. The oblique thickness replaces the function of the front surface. The oblique thickness is represented by splines. In a simultaneous optimization the coefficients of the back surface are varied together with the coefficients of the oblique thickness.

During optimization, at each optimization step an evaluation is made of the target function to calculate the deviation of the properties of the actual lens from the ideal concepts. To compute the properties of the spectacle lens, differential-geometric parameters such as surface normals and curvatures at the points of penetration of the principal rays through the surfaces are needed, the determination of which in turn requires partial differentiation.

A calculation of these parameters is known from the literature, so that it will not be discussed in detail here.

In the representation used in the invention, the computation of the partial differentials differs from the normal case, because the front surface is not represented as usual in its own coordinate system K1 by the coordinates of the front surface $x_1$ and $y_1$ (such as by the radius vectors $r_1(x_1, y_1)$), but in the coordinate system of the back surface K2 by the coordinates $x_2$ and $y_2$:

$$r_1(x_2, y_2).$$

The partial differentials of the front surface with respect to the coordinates of the back surface are obtained by a differentiation of (1):

$$\frac{\partial \vec{r}_1}{\partial x_2} = \frac{\partial \vec{r}_2}{\partial x_2} - \frac{\partial d}{\partial x_2} \cdot \vec{t} - d \cdot \frac{\partial \vec{t}}{\partial x_2}$$

$$\frac{\partial \vec{r}_1}{\partial x_2} = \frac{\partial \vec{r}_2}{\partial x_2} - \frac{\partial d}{\partial x_2} \cdot \vec{t} - d \cdot \frac{\partial \vec{t}}{\partial x_2}$$

$$\frac{\partial \vec{r}_1}{\partial x_2} = \frac{\partial \vec{r}_2}{\partial x_2} - \frac{\partial d}{\partial x_2} \cdot \vec{t} - d \cdot \frac{\partial \vec{t}}{\partial x_2}$$

$$\frac{\partial \vec{r}_1}{\partial x_2} = \frac{\partial \vec{r}_2}{\partial x_2} - \frac{\partial d}{\partial x_2} \cdot \vec{t} - d \cdot \frac{\partial \vec{t}}{\partial x_2}$$

-continued $$\frac{\partial \vec{r}_1}{\partial x_2} = \frac{\partial \vec{r}_2}{\partial x_2} - \frac{\partial d}{\partial x_2} \cdot \vec{t} - d \cdot \frac{\partial \vec{t}}{\partial x_2}$$

The differentials necessary for the computation of the surface properties of the front surface are thus given. The differential-geometric parameters-such as the surface normal vector and the principal curvatures are then obtained as in the standard case.

For creating a spectacle lens according to the method set out here, there are various options:

One option relates to apportioning the addition power between the front and back surface. Whilst in prior art the procedure is adopted of providing the front surface with a surface addition power which exceeds the actually needed addition power, and which of necessity renders the back surface "degressive", in the invention it is preferred for the surface addition powers to be apportioned either uniformly (with a ratio of front surface to back surface of 50/50) or at the most with a ratio of 80/20 or at least with a ratio of 20/80. According to a proposal of prior art (Johnson & Johnson), this ratio would be, for example, 130/100.

Another option consists of apportioning the astigmatism between the front and the back surface. For a prescribed astigmatism at least one of the two surfaces must produce the astigmatic power. As a rule this is the back surface in prior art. In accordance with the invention, not only the addition power but also the astigmatism may be apportioned as desired between the front and back surface.

For example, with a prescription of 2 dpt astigmatism it is conceivable to provide the front surface with 4 dpt astigmatism which must then be compensated accordingly on the back surface with 2 dpt having the correct cylinder axis. In this case the ratio of the surface astigmatism of the front and the back surface is 2. But even with prescriptions of 0 astigmatism, a surface astigmatism can be introduced "artificially", e.g. 1.5 dpt on the front surface, which is then compensated by 1.5 dpt on the back surface. In this case the ratio of the surface astigmatism of the front and the back surface is 1.

In a comparison with simple progressive spectacle lenses, the advantages of this apportioning consist on the one hand of a reduction of weight resulting from the reduction of the critical thickness by at least 10%, and on the other hand of a reduction of peripheral astigmatism of up to 30% in a wearing position.

The invention claimed is:

1. Method for fabricating a double-progressive spectacle lens, comprising:
    selecting a suitable coordinate system K2 for the representation of a back surface;
    selecting a suitable grid G for the representation of a spline of the back surface of a starting lens to be optimized in the coordinate system K2;
    assigning sagittal height data of the back surface to a spline (back surface spline);
    defining a position of a center of rotation of an eye;
    computing principal rays from the center of rotation of the eye through the starting lens at grid points of G;
    computing a length of a distance between points of penetration of a thus computed principal ray through a front surface and the back surface (oblique thickness);
    assigning data of the oblique thickness (thickness spline) to a spline;
    selecting a set of assessment positions at which an optical quality is computed for a target function;
    suitably selecting particular optical and geometrical stipulations which are satisfied at the assessment positions;
    defining the target function as a deviation of the quality of an actual spectacle lens from ideal values;
    starting the optimization;
    evaluating at each one of optimization steps the optical properties in a wearing position at the assessment points using surface properties to be computed and actual principal ray data;
    ending the optimization when the target function is below a predetermined value, or after a specifiable maximum number of optimization steps; and
    fabricating a thus computed surface.

2. Method according to claim 1, wherein the back surface is represented by a spline on a two-dimensional grid in the coordinate system K2 of the back surface, and by radius vectors $\vec{r}_2(x_2, y_2)$ to the grid points in K2, whilst the front surface is represented in the sane coordinate system K2 by a radius vector $$\vec{r}_1(x_2, y_2) = \vec{r}_2(x_2, y_2) - d(x_2, y_2) \cdot \vec{t}(x_2, y_2)$$

i.e. by a point on the back surface, and an oblique thickness d, represented as a spline, along a principal-ray unit-vector $\vec{t}$.

3. Method according to claim 2, wherein spline coefficients of the back surface and spline coefficients of the oblique thickness are simultaneously optimized in one optimization method.

4. Method according to claim 3, wherein a two-dimensional grid on which the spline is represented may be equidistant or not equidistant.

5. Method according to claim 4, wherein coordinates are curvilinear coordinates.

6. Method according to claim 5, wherein surface power increase is apportioned to the front and the back surface in a ratio between 80/20 and 20/80.

7. Method according to claim 6, wherein surface astigmatism is apportioned to the front and the back surface in any desired ratio.

8. Method according to claim 7, wherein the ratio of the surface astigmatism of the front surface to that of the back surface is smaller than 4.

9. Method according to claim 8, wherein the ratio of the surface astigmatism of the front surface to that of the back surface is smaller than or equal to 1.

10. Method according to claim 1, wherein spline coefficients of the back surface and spline coefficients of the oblique thickness are simultaneously optimized in one optimization method.

11. Method according to claim 1, wherein a two-dimensional grid on which the spline is represented may be equidistant or not equidistant.

12. Method according to claim 1, wherein coordinates are curvilinear coordinates.

13. Method according to claim 1, wherein surface power increase is apportioned to the front and the back surface in a ratio between 80/20 and 20/80.

14. Method according to claim 1, wherein surface astigmatism is apportioned to the front and the back surface in any desired ratio.

15. Method according to claim 14, wherein the ratio of the surface astigmatism of the front surface to that of the back surface is smaller than 4.

16. Method according to claim 14, wherein the ratio of the surface astigmatism of the front surface to that of the back surface is smaller than or equal to 1.

17. Double progressive spectacle lens computed according to claim 9.

18. Spectacle lens according to claim 17, wherein at least one of the addition power and the astigmatism is apportioned to at least one of the front and the back surface.

19. Double progressive spectacle lens computed according to claim 1.

20. Spectacle lens according to claim 19, wherein at least one of the addition power and the astigmatism is apportioned to at least one of the front and the back surface.

* * * * *